United States Patent [19]

Kitamura et al.

[11] Patent Number: 5,140,148
[45] Date of Patent: Aug. 18, 1992

[54] METHOD AND APPARATUS FOR DRIVING IMAGE SENSOR DEVICE

[75] Inventors: Koichi Kitamura; Hidenori Mimura; Kazuo Yamamoto; Yasumitsu Ohta; Kazuyoshi Sai, all of Kawasaki, Japan

[73] Assignee: Nippon Steel Corporation, Tokyo, Japan

[21] Appl. No.: 591,772

[22] Filed: Oct. 2, 1990

[30] Foreign Application Priority Data

Oct. 2, 1989 [JP] Japan ................... 1-258239

[51] Int. Cl.⁵ .............................................. H01J 40/14
[52] U.S. Cl. ............................. 250/208.1; 358/213.11
[58] Field of Search ................... 250/208.1; 358/482, 358/483, 213.11, 213.31, 213.15, 213.18, 213.26, 213.27

[56] References Cited

U.S. PATENT DOCUMENTS

| 4,461,956 | 7/1984 | Hatanaka et al. | 250/208.1 |
| 4,495,409 | 1/1985 | Baji et al. | 250/208.1 |
| 4,584,607 | 4/1986 | Miyazawa | 358/483 |
| 4,608,606 | 8/1986 | Levine | 358/213.15 |
| 4,672,453 | 6/1987 | Sakamoto | 358/483 |
| 4,788,595 | 11/1988 | Tamada et al. | 358/213.31 |
| 4,831,451 | 5/1989 | Hynecek | 358/213.31 |
| 4,980,546 | 12/1990 | Berger | 250/208.1 |

FOREIGN PATENT DOCUMENTS 59-67770 4/1984 Japan .

Primary Examiner—David C. Nelms
Assistant Examiner—Michael Messinger
Attorney, Agent, or Firm—Steven M. Rabin

[57] ABSTRACT

An image sensor device having a plurality of sensor elements connected in a matrix is driven by sequentially applying successive driving pulses, wherein a leading edge of a driving pulse coincides with a trailing edge of a preceding driving pulse and the slew rate at the leading edge is equal to the slew rate at the trailing edge.

14 Claims, 4 Drawing Sheets

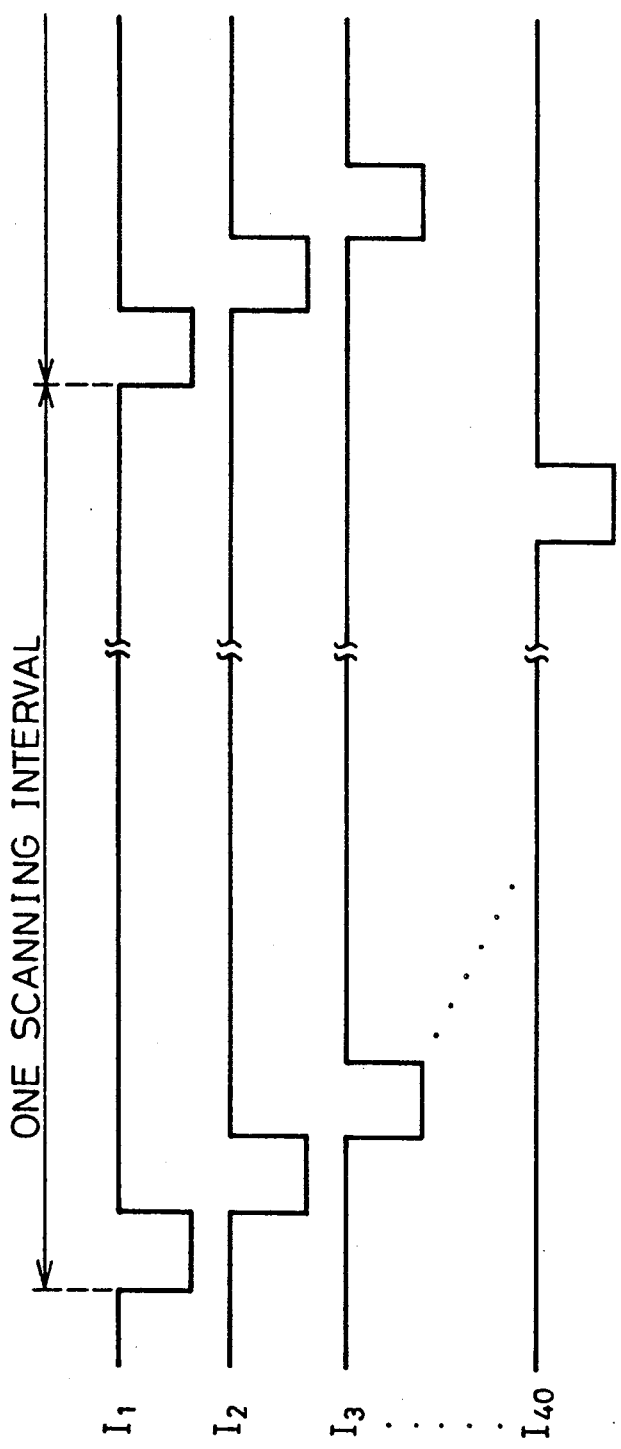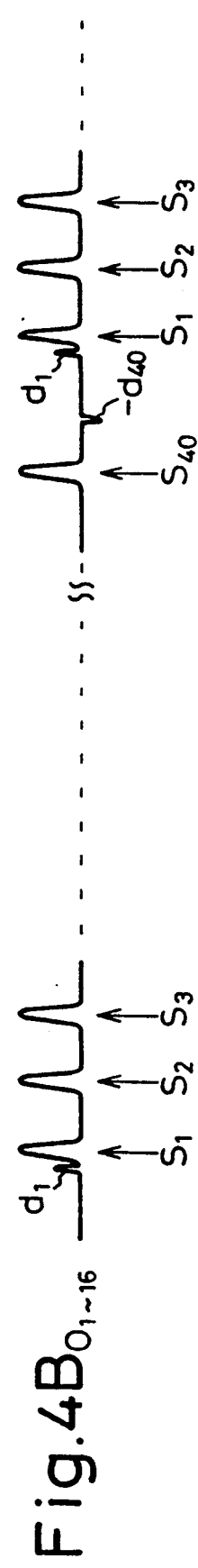

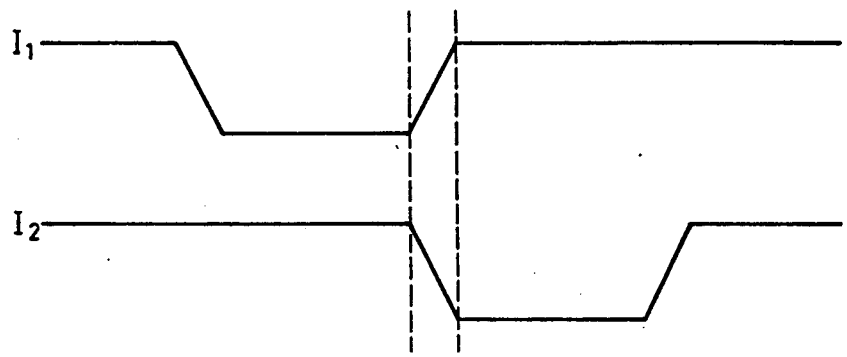
Fig.5
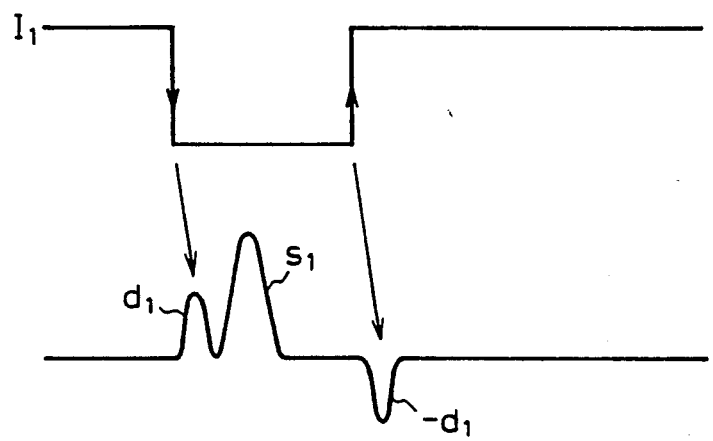
Fig.6A
Fig.6B
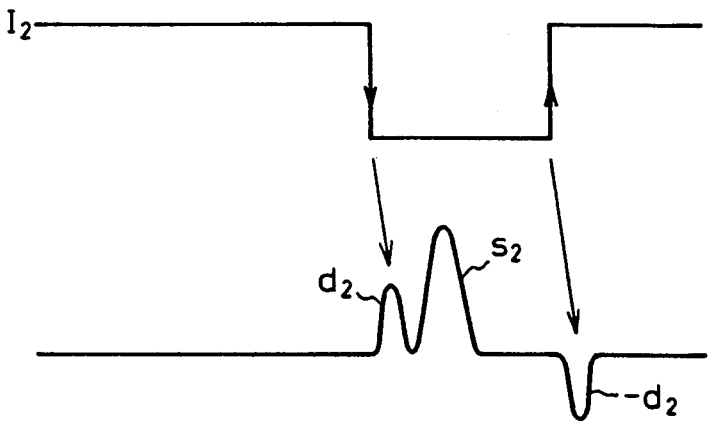
Fig.6C
Fig.6D

METHOD AND APPARATUS FOR DRIVING IMAGE SENSOR DEVICE

BACKGROUND OF THE INVENTION

1. Field of the Invention

The present invention relates to a method and an apparatus for driving an image sensor device wherein a plurality of sensing elements are connected in a matrix. More particularly, the present invention relates to a method and an apparatus for driving a contact image sensor device having the aforementioned construction.

Contact image sensor devices are used for small-size facsimile terminal equipment, bar code readers, and the like.

2. Description of the Related Art

Since a contact image sensor device can sense an image of objects without use of an optical system for reduction of the image, the length of an optical path can be so shortened that equipment comprising the contact image sensor device can be miniaturized. For this reason, recently, contact image sensor devices are widely used as an image sensing unit in small-size facsimile terminal equipment, a bar code readers, and the like.

Though various types of contact image sensor devices are known, the contact image sensor device which is referred to in the present invention is a type of sensor device, which comprises a plurality of photodiodes connected in a matrix and an equal number of blocking diodes one each provided with each photodiode to prevent a so-called crosstalk phenomenon, and wherein successive driving pulses are sequentially applied to the blocking diodes to readout electrical signals from the photodiodes.

This type of contact image sensor device has an advantage that both photodiodes and the blocking diodes can be constituted by diodes having the same construction, so that the degree of integration of the sensor elements can be increased.

The prior art with regard to driving the contact image sensor device is described, in Japanese Unexamined Patent Publication (Kokai) No. 59-67770. In this publication, intervals between successive driving pulses are not considered. Therefore, needless pulses appear at the leading edge and trailing edge of the driving pulses in addition to signal pulses caused by light signals from a document, and thus noise pulses are included in output signals from the photodiodes. These noise pulses are caused by transfer of electrical charge stored at junction capacitances of the photodiode and the blocking diode. This phenomenon is referred to hereinafter as "capacitance kick". These noise pulses caused by the capacitance kick make image information of the document incorrect, and lower the S/N ratio.

SUMMARY OF THE INVENTION

It is an object of the present invention to provide a method and an apparatus for driving an image sensor device, wherein generation of the aforementioned needless pulses is suppressed.

In accordance with the present invention, there is provided a method for driving an image sensor device which has a plurality of sensor circuits constituted from a plurality of sensor circuit blocks and connected in a matrix, comprising a step of sequentially applying successive driving pulses to each sensor circuit block wherein a leading edge of a driving pulse coincides with a trailing edge of a preceding driving pulse and the slew rate at the leading edge is substantially equal to the slew rate at the trailing edge.

In accordance with the present invention there is also provided an apparatus for driving an image sensor device which has a plurality of sensor circuits constituted from a plurality of sensor circuit blocks and connected in a matrix, comprising means for sequentially applying successive driving pulses to each sensor circuit block wherein a leading edge of a driving pulse coincides with a trailing edge of a preceding driving pulse and the slew rate at the leading edge is substantially equal to the slew rate at the trailing edge.

BRIEF DESCRIPTION OF THE DRAWINGS

FIGS. 4A, 4B, 5, 6A, 6B, 6C, and 6D are timing charts for explaining a manner wherein an image sensor device is driven according to the present invention.

DESCRIPTION OF THE PREFERRED EMBODIMENTS

Figure 1:
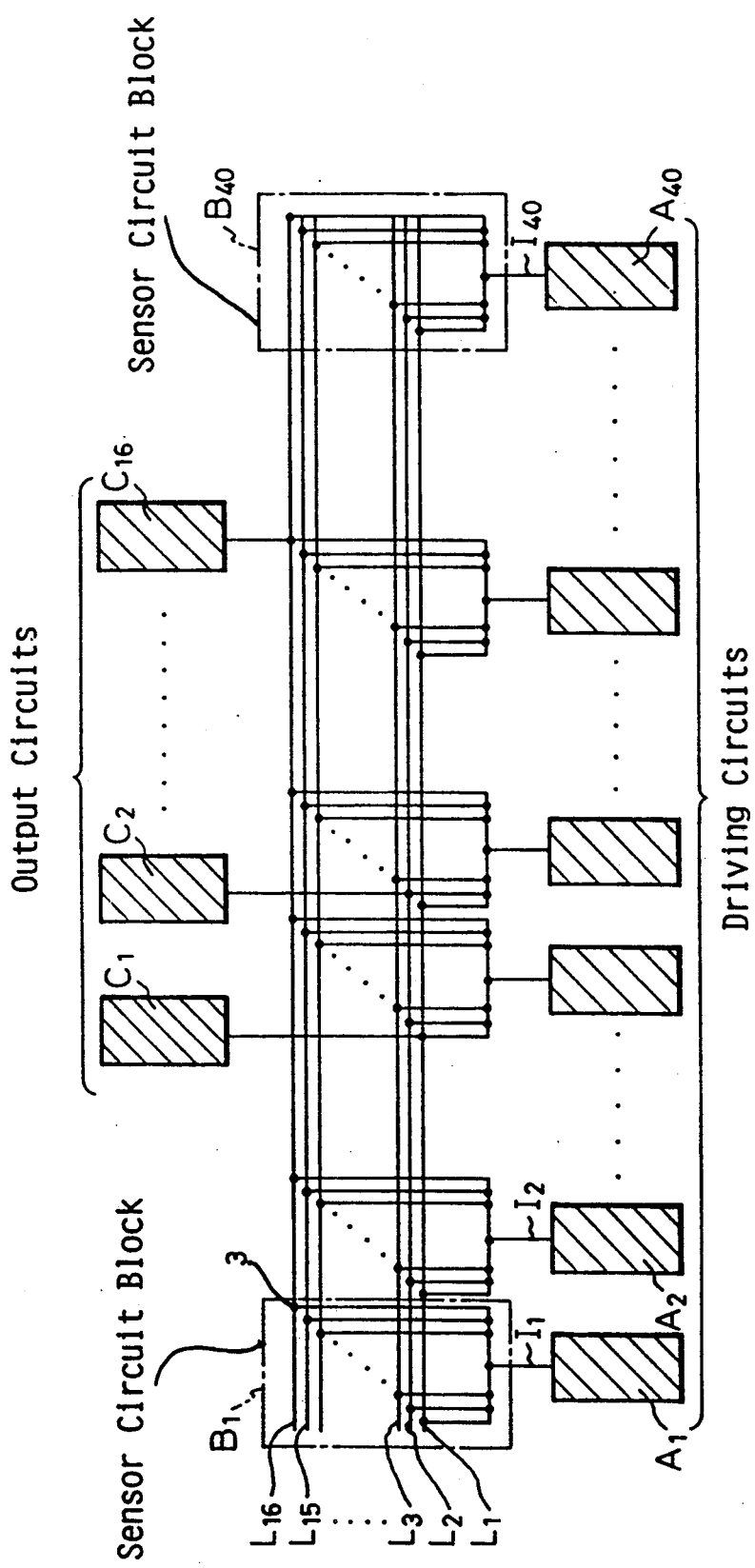
FIG. 1 is a circuit diagram of a contact image sensor device.

FIG. 1 shows a circuit diagram of a contact image sensor device, wherein sensor elements are connected in a matrix, according to the present invention. $A_1$ to $A_{40}$ denote driving circuits, $B_1$ to $B_{40}$ denote photoelectric conversion circuit blocks, $C_1$ to $C_{16}$ denote output circuits. Output lines $L_1$ to $L_{16}$ are provided corresponding to the output circuits $C_1$ to $C_{16}$.

Figure 2:
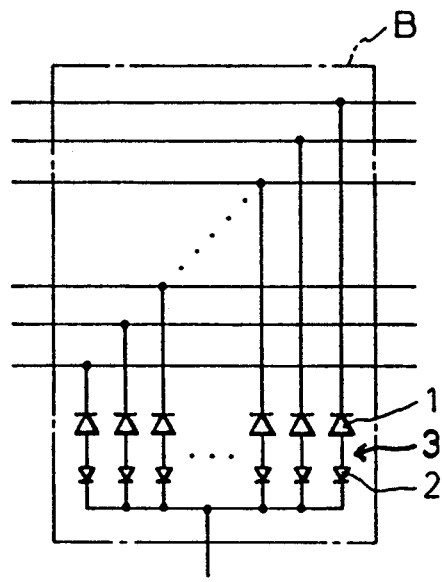
FIG. 2 is a circuit diagram showing a more detailed construction of the photoelectric conversion circuit blocks in FIG. 1.

FIG. 2 shows a detailed construction of the photoelectric conversion circuit block. Each photoelectric conversion circuit block $B_1$ to $B_{40}$ comprises sixteen photodetectors, in the disclosed embodiment photodiodes 1, and sixteen blocking diodes 2 which are connected to the photodiodes 1, respectively, to form sixteen sensor circuits each comprised of a photodiode 2 and a blocking diode 1 series connected, and the sixteen photodiodes 1 are connected to the output lines $L_1$ to $L_{16}$, respectively. Accordingly, forty photodiodes are connected to one output line, wherein the number forty corresponds to the number of the photoelectric conversion circuit blocks $B_1$ to $B_{40}$.

Figure 3A:
FIGS. 3A and 3B are a timing charts for explaining "capacitance kick"
Figure 3B:
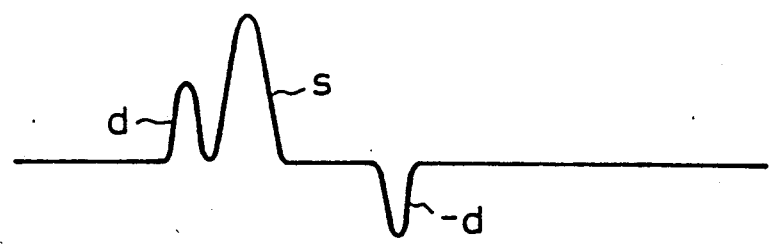

When a driving pulse as shown in FIG. 3A is supplied from a driving circuit to a blocking diode in a photoelectric conversion circuit block, a signal is output as shown in FIG. 3B, wherein "s" denotes a pulse caused by a light signal from a document, and "d" and "−d" denote noise pulses caused by capacitance kick appearing at the leading edge and the trailing edge, respectively. If successive driving pulses one of which is as shown in FIG. 3A are sequentially applied to the blocking diodes 2 in the photoelectric conversion circuit blocks $B_1$ to $B_{40}$, signals shown in FIG. 3B would continuously appear in each of the common output lines $L_1$ to $L_{16}$.

FIGS. 4A and 4B show a manner wherein a contact image sensor device is driven according to the present invention. As shown in FIG. 4A, the driving current pulses $I_1$ to $I_{40}$ are applied so that a leading edge of a driving pulse $I_i$ coincides with a trailing edge of a preceding driving pulse $I_{i-1}$. Also, as shown in FIG. 5, the slew rate (rate of variation of voltage to unit time) of the driving pulses at the leading edge is equal in amplitude and opposite in sign to the slew rate at the trailing edge. Accordingly, the needless pulse $d_2$ (FIG. 6D) caused by the driving pulse $I_2$ (FIG. 6C) is generated simultaneously with the needless pulse $-d_1$ (FIG. 6B) due to the preceding driving pulse $I_1$ (FIG. 6A), and waveshapes of the two pulses $-d_1$ and $d_2$ become symmetrical with each other.

These output signals are output on common output lines $L_1$ to $L_{16}$. Therefore, the aforementioned needless pulses $-d_1$ and $d_2$ are cancelled out. The output signals caused by $I_3$ to $I_{40}$ are similar to those as mentioned above. Accordingly, finally obtained output signals $O_1$ to $O_{16}$ include natural image signals $s_1$ to $s_{40}$, the first needless pulse $d_1$, and the last needless pulse $-d_{40}$, and the other needless pulses are cancelled out, as shown in FIG. 4B.

Practically, the last needless pulse $-d_{40}$ is not a problem because the pulse $-d_{40}$ appears sufficiently later than the signal pulse $s_{40}$. On the other hand, the first needless pulse $d_1$ can affect the output signal of the image sensor device if it remains. To deal with this, a dummy driving circuit may be additionally provided, so that the driving circuit generates the first needless pulse $d_1$ and a dummy signal pulse which is discarded, and only pulses generated by the other driving circuits are used, and thus only output signals corresponding to the image information are obtained.

An experiment of picking up an image which the inventors carried out using the aforementioned apparatus showed that the noise component is reduced from 0.1 V to 0.01 V in an output signal when a black document is read out.

We claim:

1. A method of driving an image sensor which includes a plurality of sensor circuit blocks, each circuit block including a plurality of sensor circuits and being connected in a matrix, and each sensor circuit including a photodetector which is responsive to a driving pulse applied thereto to output an electrical signal representing a light signal received by said photodetector, the method comprising the step of sequentially applying successive driving pulses to each circuit block such that in the circuit block, the driving pulse is applied directly to the sensor circuits and is received by the photodetectors, wherein a leading edge of a driving pulse substantially coincides with a trailing edge of a preceding driving pulse and the slew rate at the leading edge is substantially equal in magnitude and opposite in sign to the slew rate at the trailing edge.

2. A method according to claim 1, wherein each photodetector is a photodiode and each sensor circuit further includes a blocking diode connected to the photodiode.

3. A method according to claim 2, wherein the blocking diode and photodiode of each sensor circuit are connected in series, said step of sequentially applying successive driving pulses includes the step of applying the driving pulses directly to the blocking diodes.

4. A method according to claim 3, further comprising the step of outputting from each circuit block first unnecessary signals in response to the leading edge of the driving pulse applied thereto and second unnecessary signals in response to the trailing edge of the driving pulse, with the first and second unnecessary signals having equal amplitude and opposite sign, each first unnecessary signal canceling out the second unnecessary signal output by the circuit block to which the preceding driving pulse was applied.

5. A method according to claim 4, wherein said step of outputting the first and second unnecessary signals includes the step of transferring electrical charge stored in junction capacitances of the photodiodes and blocking diodes of the respective sensor circuits.

6. A method according to claim 1, wherein the driving pulses are current pulses and said step of applying driving pulses comprises the step of sequentially applying the current pulses to each circuit block.

7. A method according to claim 1, further comprising the step of outputting from each circuit block first unnecessary signals in response to the leading edge of the driving pulse applied thereto and second unnecessary signals in response to the trailing edge of the driving pulse, with the first and second unnecessary signals having equal amplitude and opposite sign, the first unnecessary signal canceling out the second unnecessary signal output by the circuit block to which the preceding driving pulse was applied.

8. An apparatus comprising
an image sensor device which includes a plurality of sensor circuit blocks, each circuit block including a plurality of sensor circuits and being connected in a matrix, each sensor circuit including a photodetector which is responsive to a driving pulse applied thereto to output an electrical signal which includes an image signal representing an amount of light received by said photodetector; and
means for driving said image sensor device, including means for sequentially applying successive driving pulses to each sensor circuit block such that in each circuit block the driving pulse is applied directly to the sensor circuits and is received by the photodetectors, wherein a leading edge of a driving pulse substantially coincides with a trailing edge of a preceding driving pulse and the slew rate at the leading edge is substantially equal in magnitude and opposite in sign to the slew rate at the trailing edge.

9. an apparatus according to claim 8, wherein each photodetector is a photodiode and each sensor circuit further includes a blocking diode connected to the photodiode.

10. An apparatus according to claim 9, wherein the blocking diode and photodiode of each sensor circuit are connected in series, said means for sequentially applying successive driving pulses includes means for applying the driving pulses directly to the blocking diodes.

11. An apparatus according to claim 10, wherein each circuit block generates a first unnecessary signal in response to the leading edge of the driving pulse applied thereto and a second unnecessary signals in response to the trailing edge of the driving pulse, the first and second unnecessary signals having equal amplitude and opposite sign, each first unnecessary signal canceling out the second unnecessary signal output by the circuit block to which the preceding driving pulse was applied.

12. An apparatus according to claim 11, wherein the sensor circuits output the first and second unnecessary signals by transferring electrical charge stored in junction capacitances of the photodiodes and blocking diodes of the respective sensor circuits.

13. An apparatus according to claim 8, wherein the driving pulses are current pulses and said means for sequentially applying successive driving pulses comprises means for sequentially applying the current pulses to each circuit block.

14. An apparatus according to claim 8, wherein each circuit block generates a first unnecessary signal in response to the leading edge of the driving pulse applied thereto and a second unnecessary signal in response to the trailing edge of the driving pulse, with the first and second unnecessary signals having equal amplitude and opposite sign, each first unnecessary signal canceling out the second unnecessary signal output by the circuit block to which the preceding driving pulse was applied.

* * * * *